(12) United States Patent
Forsythe et al.

(10) Patent No.: US 6,574,331 B1
(45) Date of Patent: Jun. 3, 2003

(54) METHOD AND APPARATUS FOR PROVIDING A CALL CENTER IN A NETWORK-BASE TELEPHONE SYSTEM

(75) Inventors: William C. Forsythe, Frisco, TX (US); James R. Tighe, Frisco, TX (US); Robert T. Bell, Bountiful, UT (US)

(73) Assignee: Cisco Technology, Inc, San Jose, CA (US)

( * ) Notice: Subject to any disclaimer, the term of this patent is extended or adjusted under 35 U.S.C. 154(b) by 0 days.

(21) Appl. No.: 09/480,081

(22) Filed: Jan. 10, 2000

(51) Int. Cl.[7] .................................................. H04M 3/00
(52) U.S. Cl. .............................. 379/265.01; 379/266.01
(58) Field of Search .......................... 349/265.01–266.1

(56) References Cited

U.S. PATENT DOCUMENTS

| | | | | |
|---|---|---|---|---|
| 5,793,861 A | * | 8/1998 | Haigh | 379/265 |
| 5,915,010 A | * | 6/1999 | McCalmount | 379/265.09 |
| 5,937,057 A | | 8/1999 | Bell et al. | |
| 6,044,145 A | * | 3/2000 | Kelly et al. | 379/265 |
| 6,122,365 A | * | 9/2000 | Yegoshin | 379/266 |
| 6,314,176 B1 | * | 11/2001 | Gunasekar | 379/265.01 |
| 6,327,363 B1 | * | 12/2001 | Henderson et al. | 379/265.01 |
| 6,389,007 B1 | * | 5/2002 | Shenkman et al. | 379/265.11 |
| 6,430,282 B1 | * | 8/2002 | Bannister et al. | 379/265.09 |
| 6,493,447 B1 | * | 12/2002 | Goss et al. | 379/265 |

* cited by examiner

Primary Examiner—Creighton Smith
(74) Attorney, Agent, or Firm—Baker Botts L.L.P.

(57) ABSTRACT

A system (10) includes a network (12) of the type used to interconnect computers, and a plurality of real telephones (21–26) which are each coupled to the network. A gateway unit (36) is coupled to the network and also to some other communication media, such as trunk lines (37) of a public switching telephone network (38). A virtual phone server (32) provides a virtual simulation of one or more telephones, for purposes of providing the system with the capability to function as an inbound call center and/or an outbound call center. A call manager server (31) provides overall system control relative to the gateway unit, the virtual phone server and the telephones. Several computers (16–19) may also optionally communicate with each other over the network.

35 Claims, 3 Drawing Sheets

METHOD AND APPARATUS FOR PROVIDING A CALL CENTER IN A NETWORK-BASE TELEPHONE SYSTEM

TECHNICAL FIELD OF THE INVENTION

This invention relates in general to a telephone system and, more particularly, to provision of call center capability in a network-based telephone system.

BACKGROUND OF THE INVENTION

There are organizations which need a telephone system with call center capability. One example of a call center, commonly referred to as an inbound call center, is where the organization has a customer service line with a single publicized telephone number, such that concurrent incoming calls to that common telephone number can arrive on different telephone lines and then need to be allocated among several different telephones each staffed by a respective service representative. Another example of a call center, commonly referred to as an outbound call center, is where the call center automatically places telephone calls to telephone numbers in a list, detects whether each call is answered, and then allocates the answered calls among several telephones each manned by a sales representative.

Techniques for implementing call centers have gone through an evolutionary sequence. Early call centers were standalone, monolithic telephone systems which were completely separate from the standard telephone system, and which had their own call management, as well as their own resources such as trunk lines. An organization using such a call center would thus typically have two physically separate telephone systems, namely the standard system and the call center system. Persons who needed to use the call center would typically have two physically separate telephones on their desk, each coupled to a respective one of the standard telephone system and the call center telephone system.

The second phase of call center evolution was to integrate the call center capability into the call control unit of the standard telephone system, where the standard system was most commonly a private branch exchange (PBX) system. While this allowed integration of the call center capability into the standard telephone system, thereby avoiding the overhead of two entirely separate telephone systems, it also presented some problems. In particular, the development environment for the call center became complex. The developer for the call center needed to know the architecture for the call center software, and also the architecture for the PBX software. The underlying operating system was typically proprietary, and the instruction set and coding language were usually proprietary as well. In addition, a bug introduced into either the call center application or the PBX application could radically affect the workings of the other application.

The lack of separation between the call center and PBX software architectures was particularly problematic for a third party vendor who wished to sell call center capability for use with an existing PBX system. The third party vendor had to learn a separate PBX architecture and operating system for each PBX system for which the third party vendor wished to supply call center capability. In this regard the third party vendor was essentially at the mercy of the PBX manufacturer, and could be seriously affected by PBX bugs over which the vendor had no control. As a practical matter, the most sensible thing for the customer to do was to buy the call center capability from the PBX manufacturer, rather than from a third party vendor. However, this allowed the manufacturer to charge the customer a substantial premium for the inclusion of call center capability, and it reduced but did not eliminate the inherent problems discussed above.

A third step in the evolutionary process was to implement call center capability in the form of a standalone call center unit, which was a standard computer having line and station cards which interfaced it to the PBX through the external public switching telephone network. This had the advantage of providing a standard development environment with a standard operating system (such as one of the operating systems marketed under the trademark WINDOWS by Microsoft Corporation of Redmond, Washington). However, there were still a number of disadvantages. One example is that this approach typically required twice as many trunk lines to interface the call center unit to the PBX through the public switching telephone network as to interface the PBX itself to the public switching telephone network, or in other words a total of three times as many truck lines as the PBX system alone. Consequently, this approach was relatively costly, and presented some reliability problems. Further, the call center system could not be easily scaled, for example where a small organization was growing and had a need to expand the capability of its system. A further consideration was that the interface cards were relatively expensive, which contributed to initial system cost as well as expansion cost.

At about the same time, a few first party call control centers were developed, such as dialers in which a standard computer acted as if it was a station and could thus perform some support functions for the user. The support functions included things like address book dialing and automatic fax transmissions. However, this system still required some specific interface hardware which was costly, and which limited the capability to scale the system.

The next stage of evolution was third party control systems, in which a standard computer serving as the call center was interfaced to a special control port in the PBX system. This approach did allow the PBX system and call center to share resources, and made the call center a direct part of the PBX system. However, there were still some drawbacks. For example, this approach was dependent on the PBX manufacturer's implementation of both the necessary port, and the infrastructure needed to allow the control to take place. Also, several standards for these ports were promulgated formally or informally, but their implementation was both incomplete and inconsistent. Some PBX manufacturers added proprietary extensions to these standards, which caused the resulting interfaces to effectively become various proprietary interfaces, as opposed to equivalent interfaces conforming to a common standard. Further, the additional hardware needed in the PBX system to implement the necessary port increased the overall cost of the PBX system.

All of these prior approaches were basically built around standard telephone systems in which all telephone capability was provided using dedicated telephone lines, whether the standard and call center capabilities were separate or integrated. In recent years, as the use of computers has rapidly expanded in business and in other respects, it has become common to interface computers to each other using a computer network, so that the computers can exchange information. Certain standard network configurations have evolved, one example of which is the Ethernet standard. Information is transferred between the various computers in the form of packets or message units, several of which may need to be sent in order to make up a single message. In order to take advantage of networks of this type, many organizations have supplemented their standard telephone wiring for multiple workstations with a separate system of computer network wiring.

A very recent development is the recognition that the computer network wiring can be used not only to exchange information between computers, but also to implement a network-based PBX system which provides the functionality of a traditional PBX system, but through use of the computer network rather than through a separate configuration of dedicated telephone lines. In this approach, the telephone system and the computers all share the same network. A typical telephone system using such a network might, for example, include one or more telephones which are each coupled to the computer network, a gateway which interfaces the computer network to another computer network or to a public switching telephone network, and a call manager server which is coupled to the network and serves as the unit that controls communications between the various components of the telephone system, including the telephones and the gateway unit.

SUMMARY OF THE INVENTION

From the foregoing, it may be appreciated that a need has arisen for a method and apparatus for providing call center capability in a network-based telephone system, while avoiding the disadvantages associated with the traditional call center implementations which have been discussed above.

According to one form of the present invention, an apparatus is provided to meet this need, and includes a unit having a network interface which can be operatively coupled to a network, the unit being operable to provide an automated virtual simulation of a virtual telephone, and to facilitate transmission of telephone call information to and from the virtual telephone through the network interface using network information message units that contain information in a digital format. The unit is further operable to automatically and selectively transmit through the network interface a redirection request in order to facilitate, with respect to message units corresponding to a given telephone call, a substitution of one for the other of the first telephone and a further telephone coupled to the network.

According to another form of the present invention, a method and apparatus are provided and involve: providing a network which has coupled thereto a first telephone usable by a person; effecting an automated virtual simulation of a second telephone coupled to the network; effecting selective automated generation of a redirection request; transmitting telephone call information through the network to and from each of the first and second telephones using information message units that contain digital information representative of the telephone call information, the telephone call information including control information and audio information; and responding to generation of a redirection request by selectively facilitating substitution of one of the first and second telephones for the other thereof with respect to message units corresponding to a given telephone call.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
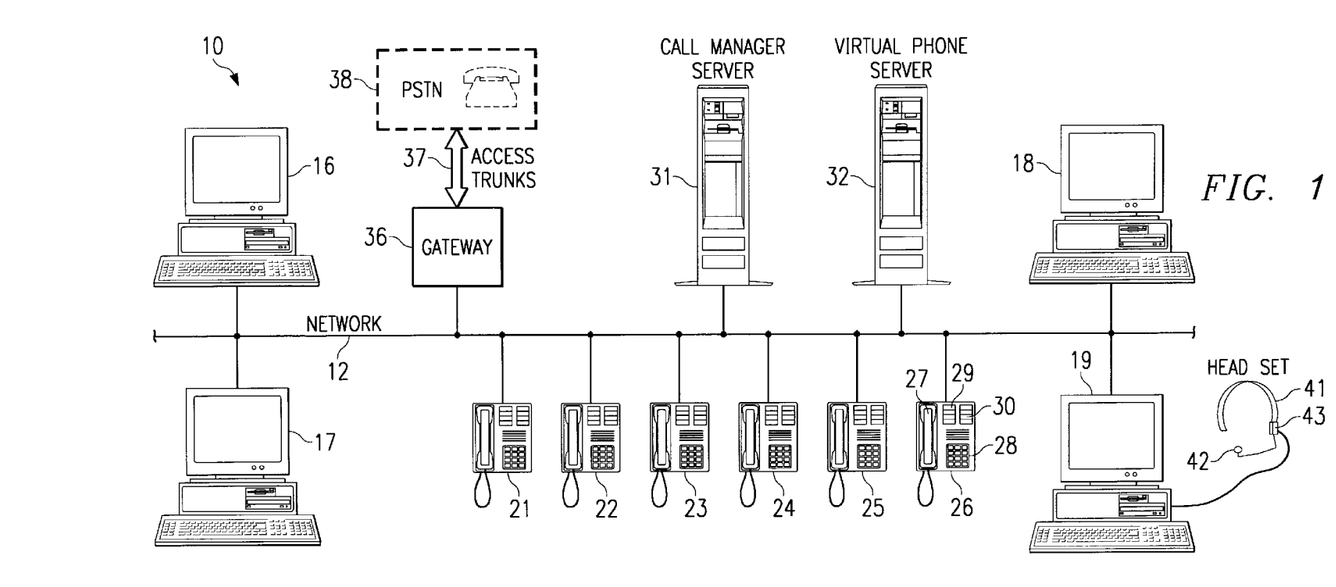
FIG. 1 is a block diagram of a system which embodies the present invention, the system including a network which facilitates communications between several computers and which also facilitates communications between components of a telephone system that provides both standard telephone capability and call center capability.

FIG. 1 is a diagrammatic view of a system 10 which embodies the present invention. The system 10 includes a network 12, which is of a known type commonly used to transfer digital information between computers. In the disclosed embodiment, the network 12 conforms to a standard which is known in the industry as the Ethernet standard. However, other types of networks could alternatively be used.

The system 10 includes several personal computers, four of which are shown at 16–19. Each of the computers 16–19 is coupled to the network 12, and the computers 16–19 can exchange information across the network 12. The computers 16–19 could be omitted for purposes of the present invention, but are included in FIG. 1 in order to emphasize that the network 12, in addition to use for implementation of a telephone system, can be concurrently used for other compatible functions such as facilitating communications between computers.

The system 10 further includes a plurality of telephones, six of which are shown at 21–26. In the disclosed embodiment, the telephones 21–16 are commercially available devices. Each of the telephones 21–26 is operationally coupled to the network 12, rather than to a traditional dedicated telephone line of the analog or digital type. In the disclosed embodiment, the telephones 21–26 are all structurally identical, and therefore only the telephone 26 is discussed here in somewhat more detail.

More specifically, the telephone 26 includes a conventional handset, and a conventional keypad 28 used to dial telephone numbers. Further, the telephone 26 includes a column of additional special-function push buttons 29, and an adjacent column of light emitting diodes (LEDs) 30. FIG. 1 shows one exemplary physical configuration of the handset 27, push buttons 28–29 and LEDs 30, but other configurations could alternatively be used.

The system 10 also includes a call manager server 31, and a virtual phone server 32. In the disclosed embodiment, the servers 31 and 32 are shown as physically separate units which are operatively and separately coupled to the network 12. However, they could alternatively be implemented in a single physical unit. The hardware for each of the servers 31 and 32 can be any of a number of different server units which are commercially available. The software which runs on the server 31 is also of a type which is commercially available, and therefore not discussed in detail here. The software which runs on the virtual phone server 32 is discussed in more detail later.

The system 10 also includes a gateway unit 36, which is coupled to the network 12, and which is also coupled through a plurality of telephone access trunk lines 37 to a conventional public switching telephone network (PSTN), which is shown diagrammatically at 38 in FIG. 1. The gateway unit 36 is a commercially available component, and therefore not discussed in detail herein.

FIG. 1 shows a headset 41 which includes a microphone 42 and an earpiece 43, and which is operationally coupled to the personal computer 19. The computer 19 is capable of running software which is commercially available, and which causes the computer 19 and headset 41 to emulate a telephone. The computer 19 may, of course, be simultaneously executing other traditional computer programs, and those programs may communicate across the network 12 with other computers such as those shown at 16–18.

A computer-implemented telephone such as that depicted at 19 and 41 in FIG. 1 is commonly referred to as a "soft" telephone, because it is not a dedicated telephone device like those shown at 21–26, which have pushbuttons and LEDs allocated to specific telephone functions. For convenience and simplicity, the present invention is discussed herein with reference to the telephones 21–26. However, it should be remembered that the telephones 21–26 are effectively equivalent to other types of telephones, such as that implemented by computer 19 and headset 41, and the discussion herein regarding the telephones 21–26 is generally applicable to a "soft" telephone as well, such as that shown at 19 and 41.

Figure 2:
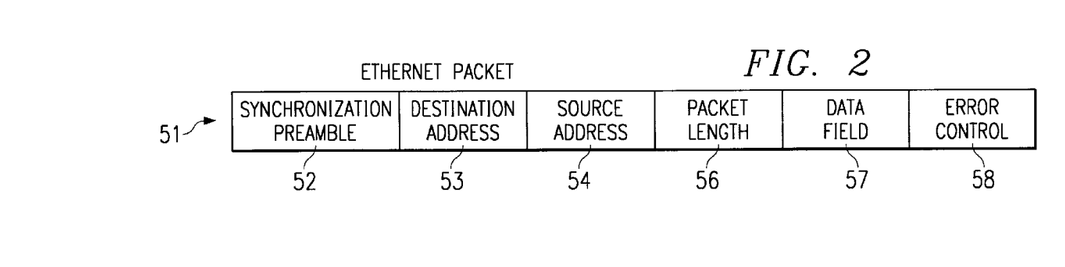
FIG. 2 is a diagrammatic view of the format of a standard Ethernet packet used to transmit information across the network of FIG. 1.

Information is transferred across the Ethernet network 12 in the form of packets or message units. FIG. 2 is a diagrammatic view of the format of a single Ethernet packet 51, which is also sometimes referred to as a frame. The format shown in FIG. 2 for packet 51 is an industry standard, and is therefore only briefly discussed here, to the extent necessary to facilitate an understanding of the present invention. More specifically, the packet 51 includes a synchronization preamble 52, an Ethernet destination address 53, an Ethernet source address 54, a packet length 56, a data field 57, and error control information 58.

The source address 54 identifies the device which transmitted the packet 51 across the network 12, and the destination address 53 identifies a different device on the network to which the packet 51 is being sent. The packet length 56 identifies the overall length of the packet 51, and the error control information 58 is used to detect and correct errors which may occur in the packet 51 during transmission. The data field 57 may be any type of information which the source device wishes to send to the destination device. To the network 12 it is simply data, but it may be treated as something other than data by the source and destination devices. For example, the source and destination devices may treat it as control information, or as a digital representation of a segment of audible sound.

In the disclosed embodiment, as to packets 51 sent between components of the telephone system (as opposed to packets 51 sent between other devices such as the computers 16–19), the information in the data fields 57 conforms to existing industry standards for network telephony. More specifically the disclosed embodiment uses the industry standards commonly known as H.323, but could alternatively use the industry standards referred to as SIP (Session Initiation Protocol), or the industry standards referred to as MGCP (Media Gateway Control Protocol). Although the disclosed embodiment uses an Ethernet network 12, the industry standards H.323, SIP and MGCP are each compatible with other types of networks.

Figure 3:
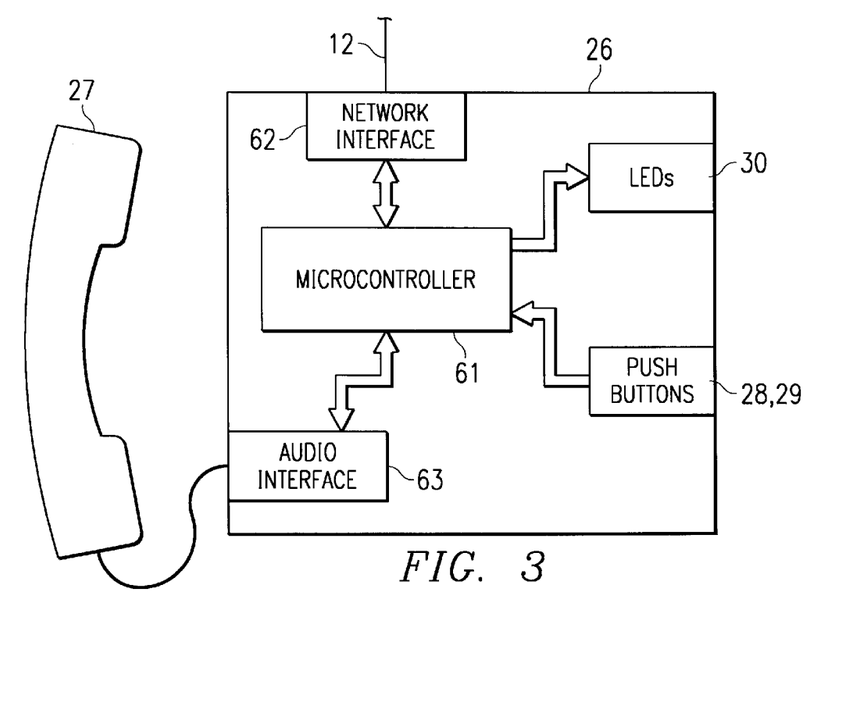
FIG. 3 is a block diagram of the circuitry in a telephone which is a component of the system of FIG. 1.

FIG. 3 is a block diagram of the telephone 26 of FIG. 1, showing the circuitry therein. As mentioned above, the telephone 26 is a commercially available device, and the circuitry within it thus has a known configuration. Consequently, it is described only briefly here for purposes of completeness, to the extent necessary to facilitate an understanding of the present invention. In more detail, the telephone 26 includes a microcontroller 61, which is a commercially available device that includes a microprocessor, a random access memory (RAM), and a read only memory (ROM).

The telephone 26 further includes a network interface circuit 62, which interfaces the microcontroller 61 to the Ethernet network 12. The telephone 26 also includes an audio interface 63, which interfaces the microcontroller 61 to the handset 27. In particular, analog signals from the microphone in the handset 27 are converted by the audio interface 63 into digital information, which is then supplied to the microcontroller 61. Similarly, the audio interface 63 converts digital information provided by the microcontroller 61 into analog signals, which are supplied to a speaker located in the earpiece of the handset 27, in order to produce audible sound. The microcontroller 61 is operatively coupled to the push buttons 28–29, and the LEDs 30.

In order to facilitate an understanding of the present invention, a brief explanation will now be given of how an incoming telephone call from the PSTN 38 might reach the telephone 26. When the incoming call from the PSTN 38 arrives at the gateway unit 36 on one of the trunk lines 37, the gateway unit 36 sends one or more Ethernet packets across the network 12 to the call manager server 31, indicating the presence of a new call and identifying the telephone number to which the call is directed. This information would be sent across the network 12 in the form of packets that each have the format shown in FIG. 2, in which the data field 57 would include digital information representing a control code and the telephone number. The call manager server 31 would then use the telephone number as an index to a cross-reference table, in order to determine the particular network port to which the call should be directed. For purposes of this example, it is assumed that the telephone number in question is currently assigned to the telephone 26, and that the server 31 would therefore determine this by consulting the cross-reference table.

The call manager server 31 would then check a status table in order to determine whether the indicated network port of the telephone 26 is already in use, for example because another call is already in progress at the telephone 26 using that port. If that port is already in use, then the call manager server 31 would check the cross-reference table again to determine whether the table indicates that an alternative port on another telephone is to be used in the event that the indicated port on telephone 26 happens to already be in use. For example, the incoming call may be routed to an alternative port associated with one of the telephones 21–25, such as a telephone assigned to the assistant for the person using telephone 26.

Assuming for purposes of this discussion that the indicated port of telephone 26 is not already in use, the server 31 would then send to the telephone 26 one or more packets containing a control code which would cause the telephone 26 to ring, and to flash one of the LEDs 30. In the event a person answered the telephone 26, either by lifting the handset 27 or by pressing the push button 29 adjacent the flashing LED 30, the telephone 26 would send a control code back to the call manager server 31 to indicate this. The server 31 would then update its status table to indicate that a call is now in progress at telephone 26 with respect to the particular network port. Further, the server 31 would send to the telephone 26 one or more packets indicating that the flashing LED should be kept on without flashing. Then the server 31 would send to the gateway unit 36 one or more packets containing a control code which identifies the particular network port to which the call should be directed.

The gateway unit 36 would then convert the audio information of the telephone call into a series of packets or message units such as that shown at 51 in FIG. 2, and send these packets across the network 12 to the telephone 26. In the packet format 51, the data field 57 in each packet would include digital information representing a segment of audio information. The microcontroller 61 and audio interface 63 (FIG. 3) in the telephone 26 would then convert this digital information representing audio sound back into analog signals, and send the signals to the speaker in the earpiece of handset 27. Similarly, audio sound received by the microphone in the handset 27 would be converted by audio interface 63 and microcontroller 61 into a series of packets containing digital data representing the audio sound, which would be sent from telephone 26 across network 12 to gateway unit 36, which in turn would convert this digital information back into analog signals representing the audio sound, and supply these analog signals to the appropriate trunk line 37.

At the end of the telephone call, the person at telephone 26 would put the handset 27 in its cradle, or press a push button 29, causing the telephone 26 to send a control code across the network 12 to the server 31, indicating that the call had been completed. The server 31 would then send the telephone 26 one or more packets containing a control code indicating that the LED 30 associated with that call should be turned off. Further, the server 31 would update its status table so as to indicate that no call was currently in progress with respect to that particular network port at telephone 26. The call manager server 31 would in turn inform the gateway unit 36 that the telephone call had been terminated.

Figure 4:
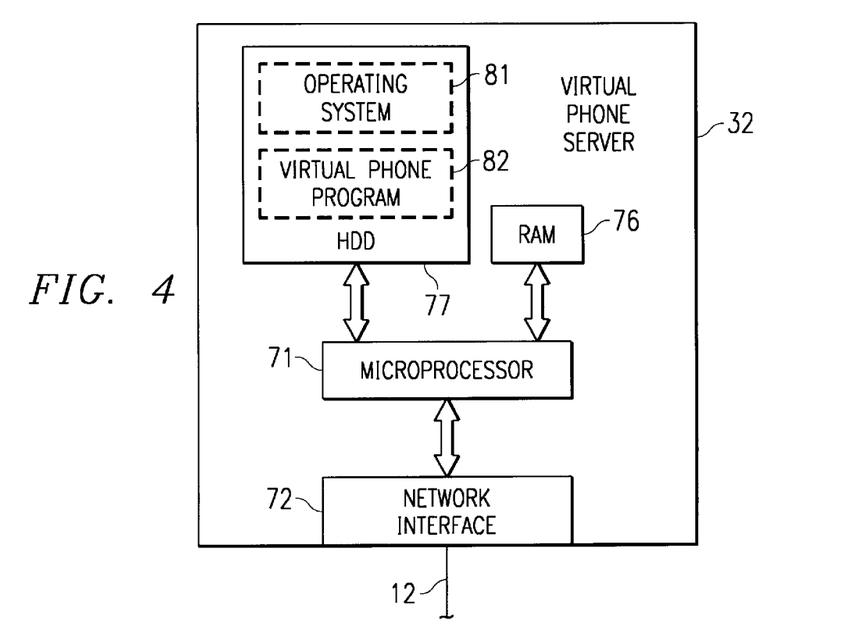
FIG. 4 is a block diagram of the major components in a virtual phone server which is a component of the embodiment of FIG. 1.

Turning in more detail to the virtual phone server 32, FIG. 4 is a block diagram of the internal configuration of the server 32. As mentioned above, the hardware of the disclosed server 32 is a commercially available computer with a configuration which is known. In this regard, the server 32 includes a microprocessor 71, a network interface circuit 72, a random access memory (RAM) 76, and a hard disk drive (HDD) 77. The network interface circuit 72 couples the microprocessor 71 to the network 12. The network interface circuit 72 may be a commercially available plug-in card having thereon a network interface circuit. The RAM 76 is used by the microprocessor 71 to store instructions from one or more programs which are currently being executed, and to store variables or other data being manipulated by these programs. The HDD 77 contains the master copy of the operating system 81 which is executed by the microprocessor 77. In the disclosed embodiment, the operating system is the WINDOWS NT operating system, which is commercially available from Microsoft Corporation of Redmond, Washington. The HDD 77 also includes a virtual phone program 82, which embodies aspects of the present invention and is discussed later.

The telephones 21–26 and gateway unit 36 are each designed so that, after being connected to the network 12, or when the network is being re-initialized, they each automatically go through an initialization process in which they register with the call manager 31. In a similar manner, the virtual phone server 32 is designed so that it separately registers each of its virtual phones with the call manager server 31 by emulating the manner in which the real telephones 21–26 each register with the server 31. In this manner, the call manager 31 becomes aware of all devices coupled to the network 12 which are part of the telephone system. The call manager 31 is not aware that the system includes a virtual server 32. Instead, the call manager 31 thinks that there are several physically separate real telephones, when in fact the telephones of this particular group are all virtual telephones within the server 32.

The virtual phone server 32 adds the functionality for the system 10 to function as an inbound and/or outbound call center. One example of an inbound call center is where a company has a customer service line with a single publicized number, such that concurrent calls to that number from various persons at remote locations need to be allocated among several service representatives who are using the telephones 21–26 to answer customer questions. More specifically, the customers at remote locations would each dial the same telephone number, the respective calls would come in on different physical lines in the access trunks 37, and then the virtual phone server 32, in cooperation with the call manager server 31, would route each of these calls to a respective one of the telephones 21–26 which is currently available.

An example of an outbound call center is where a company employs several sales representatives to use the telephones 21–26 to market a product or a service by telephone. The virtual phone server 32 would cooperate with the call manager server 31 in order to obtain access to a telephone line, and would then automatically dial a telephone numbers elected from a list of telephone numbers. If the call was answered, the virtual phone server 32 might optionally provide some sort of automated initial audio message, or provide a "touch-tone" menu of the known type. Ultimately, the virtual phone server 32 would allocate the answered call to one of the telephones 21–26 which was currently available, so that a sales representative could talk to the potential customer at the remote location.

The manner in which the virtual phone server 32 facilitates system operation as an inbound call center will now be described in more detail with reference to FIG. 5, which is a flowchart showing a portion of the virtual phone program 82 of FIG. 4. The flowchart of FIG. 5 shows just one exemplary way that an inbound call center might be implemented using the virtual phone server 32, because there are other possible approaches.

Figure 5:
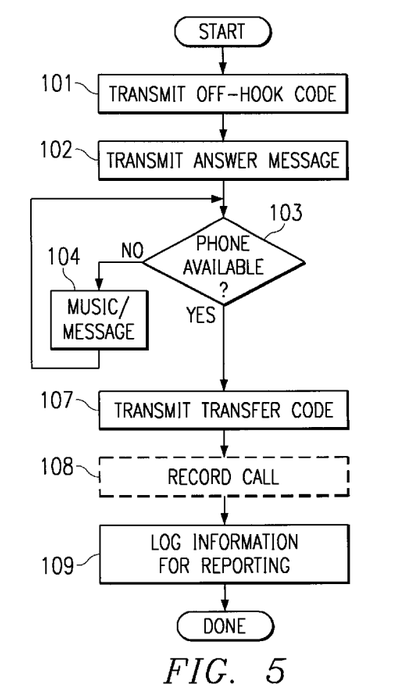
FIG. 5 is a flowchart showing one example of how inbound call center capability can be implemented in the embodiment of FIG. 1 by the virtual phone server of FIG. 4.

Referring to FIGS. 1 and 5, the gateway unit 36 and the call manager server 31 are not aware that the system 10 includes call center capability, because the server 32 appears to them to be merely a group of telephones coupled to the network 12. Consequently, an incoming call intended for the call center would be treated by the gateway unit 36 and the call manager server 31 like any other incoming call.

More specifically, the gateway unit 36 would respond to an incoming call for the call center by sending an indication of the incoming call and the corresponding telephone number to the call manager server 31, in the same basic manner as has already been described above. The call manager server 31 would then use the telephone number to consult its cross-reference table, as discussed above, in order to identify the port on the network 12 which corresponds to the particular number dialed. When viewed through the network 12, the virtual phone server 32 appears to other devices to be just several separate telephones, such as those shown at 21–26, rather than a special device such as a server. With respect to an incoming call for the call center, the call manager server will determine from its cross-reference table the corresponding network port, which will be a network port associated with one of the virtual telephones implemented by the server 32. The call manager server 31 will then check its status table to determine whether the indicated network port for that phone is currently in use, for example because another call is already in progress. If that particular network port is busy, the server 31 will consult its cross-reference table again, to identify an alternative port associated with the telephone number (which will be another port associated with the server 32), and will check its status table to determine if that alternative port is currently in use. The cross-reference table will have several alternative ports associated with each telephone line on which calls for the call center can arrive, the alternative ports corresponding to different virtual telephones of the server 32.

When the server 31 finds an available port, it sends to that port one or more packets containing a control code which indicates that the associated telephone should ring. The server 31 will also instruct the associated telephone to flash an LED, but since it is a virtual phone the server 32 will ignore the code regarding the LED. This is where the flowchart of FIG. 5 begins.

In block 101 of FIG. 5, the virtual phone server; will send back to the server 31 an off-hook control code, to indicate that the call is being answered by the virtual phone. The call manager will respond by sending a code indicating that the answering phone should now keep the flashing LED continuously turned on, but the server 32 will ignore this command because the phone in question is a virtual phone. The call manager 31 will also update its status table to indicate that a call is now in progress at the network port in question. The call manager 31 will then send to the gateway unit 36 an identification of the particular network port in question, and the gateway unit 36 will then begin exchanging audio information with that network port, or in other words with the virtual phone in the server 32.

More specifically, as soon as this interchange of audio information commences, the server 32 will transmit an audio answer message at block 102 in FIG. 5. In the disclosed embodiment, this is implemented by having the microprocessor 71 simply extract from the HDD 77 a series of predetermined digital data segments that cumulatively represent the audio answer message, and put each such data segment into the data field 57 (FIG. 2) of a respective packet 51. This answer message may, for example, greet the remote caller, advise the caller of the number or organization which has been reached, advise the caller that a conversation with a representative may be monitored by the representative's supervisor, indicate that the caller will be placed in communication with the first available representative, and/or provide some other appropriate information. The answer message 102 may also include some form of touch-tone menu, in order to determine which of several options the caller wishes to pursue. Further, the server 32 could optionally get information from the caller such as a credit card number or a customer number, or identify the telephone number of the caller using the capability commonly referred to as "caller identification" or "caller ID".

Next, at block 103, the server 32 checks to see if one of the network ports represented by telephones 21–26 is currently available. In the disclosed embodiment, the telephones 21–26 and the virtual telephones in server 32 each register with the server 31 during initialization. During this registration process, the server requests that one of its virtual phones be sent a duplicate of certain messages sent to other devices, such as the telephones 21–26. For example, as discussed above, the server 31 sends the telephones 21–26 control codes which can turn one of the LEDs on and off when an associated port or line is and is not in use. In the disclosed embodiment, the virtual phone server 32 registers to receive from the server 31 a duplicate copy of each such control code, and can thus maintain its own status table indicating whether each of the ports or lines of the telephones 21–26 is currently in use.

Using this duplicate status table, the server 32 checks at block 103 in FIG. 5 to see whether any of the telephones 21–26 is currently available. If not, the server 32 waits in a loop at blocks 103 and 104, and may optionally supply the remote caller with music and/or a message at block 104 while the caller is waiting. The message might, for example, indicate the estimated wait time until a person at one of the telephones 21–26 will be able to take the call. When one of the telephones 21–26 eventually becomes available, control proceeds from block 103 to block 107, where the server 32 sends a control code that tells the call manager server 31 to transfer the call from the network port corresponding to the virtual telephone in server 32 to the network port corresponding to the telephone 21–26 which is now available. The server 31 will then take the necessary steps to effect the transfer, which includes causing the selected one of the telephones 21–26 to ring and, when answered, includes instructing the gateway unit 36 to thereafter exchange audio information with that selected telephone. This corresponds to block 107 in FIG. 5. Once the selected telephone has been answered, the call manager 31 will update its status table to indicate that a call is now in progress at the corresponding network port.

The server 32 may optionally take advantage of standard conference call capabilities of the system, by requesting that the gateway unit 36 and the selected telephone send the server 32 a duplicate copy of each of the packets sent by the gateway unit 36 or the selected telephone in association with this call. The server 32 can then extract the digital data from the field 57 (FIG. 2) of each such packet, and store this information in chronological sequence in a file on the HDD 77, thereby effectively recording the telephone call so that a supervisor can later listen to and analyze the call. This corresponds to block 108 in FIG. 5, which is shown in broken lines to reflect the fact that it is an optional capability. In a situation where the server 32 does not use this capability, the call manager server 31 will update its status table to indicate that the network port for the virtual phone in question is no longer in use. On the other hand, if the server 32 does elect to use this capability, the server 31 will not make this update to the status table at this time.

Control ultimately proceeds to block 109, where the server 32 updates a log file with information relating to that call, so that information from that call and/or a number of other calls can be used to generate periodic reports. For example, the server 32 may prepare a report which identifies the number of incoming call center calls routed to each of the telephones 21–26, the average duration of each such call, the average time each caller waited before speaking to a representative, or some other statistic of interest.

The manner in which the virtual phone server 32 facilitates system operation as an outbound call center will now be described in more detail with reference to FIG. 6, which is a flowchart showing a portion of the virtual phone program 82 of FIG. 4. The flowchart of FIG. 6 shows just one exemplary way that an outbound call center might be implemented using the virtual phone server 32, because there are other possible approaches.

Figure 6:
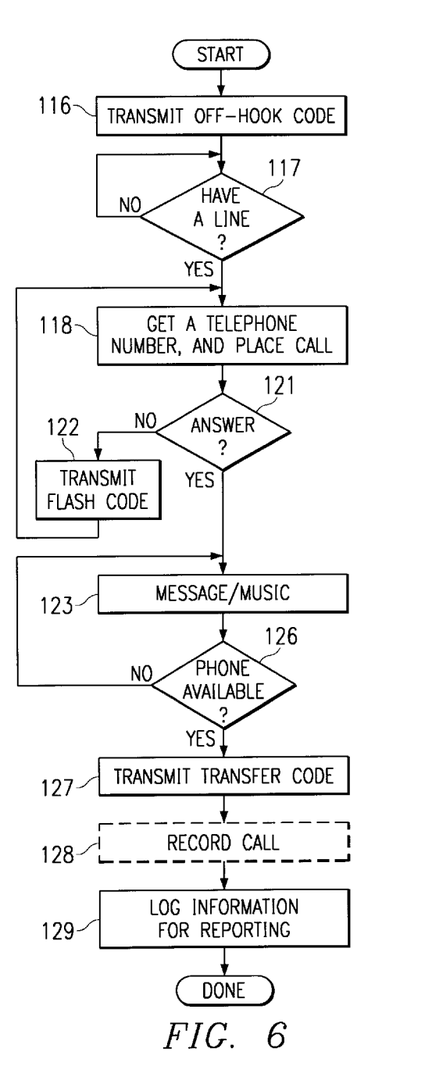
FIG. 6 is a flowchart showing one example of how outbound call center capability can be implemented in the embodiment of FIG. 1 by the virtual phone server of FIG. 4.

In block 116 of FIG. 6, the server 32 begins by sending a control code to the call manager server 31, which is the off-hook code sent by an actual telephone when its handset is lifted. This off-hook code causes the server 31 to update its status table to indicate that a call is in progress at the network port corresponding to the virtual phone associated with the code. The server 31 also sends out a code indicating that the phone in question should turn on an LED, although this code will be ignored by the server 32 because the phone in question is virtual. The off-hook code also causes the server 31 to cooperate with the gateway unit 36, in order to allocate an available telephone line to the new call. At block 117, the server 32 waits to be assigned an actual telephone line. When this occurs, the server 31 supplies the gateway unit 36 with an identification of the port corresponding to the virtual telephone in the server 32, and then the gateway unit 36 begins communicating with that port.

The server 32 then proceeds to block 118, where it gets a telephone number from a list of telephone numbers to be called, and then dials that number. It then waits at block 121 to see if a person answers the call at the remote end. If not, then at block 122 the server 32 transmits a flash code on the telephone line in order to obtain the dial tone again, and then control returns to block 118, where the server 32 gets the next telephone number from the list and dials it.

When it is ultimately detected at block 121 that a call has been answered, then control proceeds to block 123, where the server may provide an initial audio message to the person at the other end of the line, for example by providing a brief summary of the product or service being promoted, and some other background information. In the meantime, at block 126, the server 32 is checking its duplicate status table, in order to determine whether any one of the phones 21–26 is available. When one of the telephones 21–26 is or becomes available, the server 32 transfers the call to that available telephone. In this regard, the transfer and subsequent operations which occur at blocks 127–129 are effectively the same as those discussed above in association with blocks 107–109 in FIG. 5, and are therefore not described again in detail here. The server 32 would repeat the sequence of FIG. 6 as often as necessary to keep all of the telephones 21–26 involved in active telephone calls.

Although the disclosed embodiment uses the specific technique of call transfer to redirect an ingoing or outgoing call from the server 32 to one of the telephones 21–26, implementation of the present invention could alternatively be effected using other specific techniques, for example those commonly known as call deflection or call redirection. All such specific techniques, including call transfer, call deflection and call redirection, are referred to collectively herein as redirection techniques.

The present invention provides a number of technical advantages. One such technical advantage is that the virtual phone server does not require any dedicated hardware specific to any of the virtual phones that it implements. For example, it does not require special additional trunk lines, line cards or other circuitry specific to any given virtual phone. One advantage of this is that the number of virtual phones is easily scalable, from a small number to a large number, without any change in the hardware required. This not only makes it possible to use the same server for both large and small systems, but also makes it easy to scale a small system into a large system as the needs of the user change, without requiring the user to necessarily buy new or additional hardware. A related advantage is that the disclosed virtual phone server is coupled to the rest of the system only through the network, and does not require any dedicated interface such as a call center to call manager interface of the type commonly referred to as computer telephony integration (CTI).

Another technical advantage relates to the fact that, with the addition of the virtual phone server, the standard network telephone system can be used to provide both standard telephone functionality and call center functionality, avoiding the need to provide entirely separate telephone systems to implement standard telephone capability and call center capability. The use of a computer-type network avoids the need to provide additional separate wiring for the standard telephone system, or additional wiring dedicated to providing call center capability, thereby reducing the cost to install and maintain the underlying wiring needed for any or all of these functions.

A further advantage is that, where the network uses a communication protocol which conforms to an existing industry standard for network telephony, the virtual phone server becomes a modular and standalone component which can be easily added to any system in which the network conforms to that standard. In fact, components such as telephones, a gateway unit, a call manager server, and a virtual phone server made by various different manufacturers can be easily and successfully integrated into a custom system with little concern about incompatibilities, so long as the components all conform to the same industry standard. For example, a virtual phone server may be added to an existing system without any need for software changes in existing components of the system. Also, multiple virtual phone servers may be provided on the same network, at various different locations, and/or to implement respective different call centers.

Yet another advantage relates to the fact that the virtual phone server communicates with the call manager server through the network, rather than through some proprietary port provided on the call manager server. In other words, the virtual phone server according to the invention implements first party control, rather than third party control. This allows development of the virtual phone server to be carried out independently of other components in the system, which facilitates rapid and accurate development of original and improved software for the virtual phone server. For most functions, the developer needs only to imagine how the function would be carried out by a person with a standard telephone, and then duplicate that action sequence within the virtual phone server.

A related advantage results from the fact that the virtual phone server of the disclosed embodiment is implemented with a commercially available computer running a commercially available operating system, which permits program development and debugging to be carried out using commercially available development environments and tools. This significantly reduces the cost of development and maintenance, and also permits the original or customized versions of the phone server software to be developed quickly and accurately.

Although one embodiment has been illustrated and described in detail, it should be understood that various substitutions and alterations can be made thereto without departing from the scope of the present invention. For example, although the disclosed embodiment has a virtual phone server which is physically separate from other system components, including the call manager server, it will be recognized that the functionality of the call manager server and the virtual phone server could be combined into a single server. Further, although the gateway unit in the disclosed embodiment provides access to a standard public switching telephone network, it could alternatively provide access to some other type of communications system, one example of which is the Internet. As another example, the disclosed embodiment includes both computers and telephones communicating across a single network, in order to emphasize this potential capability of the network for diverse uses. However, it will be recognized that the computers are not essential, and the network could be used solely for purposes of telephony. Still another example is that the disclosed embodiment uses a cross-reference table to keep track of information such as which network port a particular call should be directed to. However, it will be recognized that there are other techniques other than a table which may be used to maintain such cross-reference information.

Yet another example is that, although the disclosed embodiment uses several telephones which are each a dedicated telephone unit having a handset, push buttons and LEDs, it will be recognized that the telephones could have some other configuration so long as they are capable of providing a human with the necessary audio and control interface. In particular, they could be a soft phone of the type implemented with a personal computer, an associated headset, and appropriate software. As yet another example, the disclosed embodiment uses a network which conforms to the Ethernet standard, but it will be recognized that the invention is compatible with other types of networks. One further example is that the foregoing discussion gives specific examples of how an incoming call center and an outgoing call center could be implemented according to the present invention, but it will be recognized that there are a number of other ways in which call centers could be implemented in a manner encompassed by the invention. Other substitutions and alterations are also possible without departing from the spirit and scope of the present invention, as defined by the following claims.

What is claimed is:

1. An apparatus, comprising a unit having a network interface which can be operatively coupled to a network, said unit being operable to:
   provide an automated virtual simulation of a virtual telephone;
   facilitate transmission of telephone call information to and from said virtual telephone through said network interface using network information message unito that contain information in a digital formal; and
   automatically and selectively transmit through said network interface a redirection request to facilitate, with respect to a subset of said message units corresponding to a given telephone call which is part of said telephone call information, a substitution of one for the other of said virtual telephone and a further telephone coupled to the network.

2. An apparatus according to claim 1, wherein said given telephone call is an incoming call to said virtual telephone through said network interface.

3. An apparatus according to claim 1, wherein said given telephone call is an outgoing call from said virtual telephone through said network interface.

4. An apparatus according to claim 1, wherein said unit is operable, prior to transmission of said redirection request, for transmitting through said network interface message units which represent a predetermined audio message.

5. An apparatus according to claim 1, wherein said unit is further operable to implement a call center capability.

6. An apparatus according to claim 5, wherein said unit is further operable to:
   identify, from several telephones coupled to the network, a telephone that is currently free of a call in progress;
   thereafter facilitate generation at the identified telephone of an incoming call indication perceptible by a person; and
   thereafter effect said transmission of said redirection request in response to a manual operation at said identified telephone.

7. An apparatus according to claim 1, wherein said unit is operable, after transmission of the redirection request, to store information which corresponds to the redirected call and which can be used to generate a report.

8. An apparatus according to claim 1, wherein said unit is operable, after transmission of the redirection request, to record the redirected call by storing digital information from the series of message units which correspond to the redirected call.

9. An apparatus according to claim 1, wherein said unit is implemented using a computer which runs a standard operating system.

10. An apparatus, comprising:
    a network through which can be transmitted information message units that contain information in a digital format;
    a first telephone which is coupled to said network and which is usable by a person;
    a first section which is coupled to said network, which provides an automated virtual simulation of a second telephone, and which can automatically and selectively generate a redirection request; and
    a second section operable to use message units to transmit telephone call information through said network to and from each of said first and second telephones, said telephone call information including control information and audio information, and said second section being operable in response to generation by said first section of a redirection request for selectively facilitating substitution of one of said first and second telephones for the other thereof with respect to message units corresponding to a given telephone call.

11. An apparatus according to claim 10, wherein said second section includes a portion operatively coupling said network to a public switching telephone network containing a third telephone, and wherein said given telephone call is an incoming telephone call from said third telephone.

12. An apparatus according to claim 10, wherein said second section includes a portion operatively coupling said network to a public switching telephone network containing a third telephone, and wherein said given telephone call is an outgoing telephone call to said third telephone.

13. An apparatus according to claim 10, including a plurality of said first telephones and a plurality of said second telephones, and wherein said first section implements a call center capability.

14. An apparatus according to claim 13, wherein said first section is operable, prior to generation of the redirection request, for identifying one of said first telephones which is currently free of a call in progress, for thereafter cooperating with said second section to cause said identified first telephone to generate an incoming call indication which is perceptible by a person, and for thereafter responding to a manual operation at said identified first telephone by generating the redirection request.

15. A method comprising the steps of:
- providing a network which has coupled thereto a first telephone usable by a person;
- effecting an automated virtual simulation of a second telephone coupled to said network, including selective automated generation of a redirection request;
- transmitting telephone call information through said network to and from each of said first and second telephones using information message units that contain digital information representative of said telephone call information, said telephone call information including control information and audio information; and
- responding to generation of a redirection request by selectively facilitating substitution of one of said first and second telephones for the other thereof with respect to message units corresponding to a given telephone call.

16. A method according to claim 15, wherein said network has a plurality of said first telephones coupled thereto, wherein said step of effecting an automated virtual simulation includes the step of effecting an automated virtual simulation of a plurality of said second telephones; and including the step of effecting automated control of said plural second telephones in a manner implementing a call center capability.

17. A method according to claim 16, wherein said step of effecting automated control includes, prior to said generation of the redirection request, the step of transmitting message units representing a predetermined audio message from one of said second telephones through said network to a further telephone which is coupled to the network and involved in said given telephone call.

18. A method according to claim 16, wherein said step of effecting automated control includes, prior to said generation of the redirection request, the step of identifying one of said first telephones which is currently free of a call in progress, thereafter generating at said identified first telephone a perceptible indication of an incoming call, and thereafter responding to a manual operation at said identified first telephone by effecting said generation of the redirection request.

19. A method according to claim 15, including after said generation of the redirection request, the step of storing information which corresponds to the redirected call and which can be used to generate a report.

20. A method according to claim 15, including after said generation of the redirection request, the step of recording the redirected call by storing digital information from a series of the message units which correspond to the redirected call.

21. An apparatus, comprising:
- a network through which can be transmitted information message units that contain information in a digital format;
- a first telephone which is coupled to said network and which is usable by a person;
- first means coupled to said network for providing an automated virtual simulation of a second telephone, and for automatically and selectively generating a redirection request; and
- second means for using message units to transmit telephone call information through said network to and from each of said first and second telephones, said telephone call information including control information and audio information, and said second means being operable in response to generation by said first means of a redirection request for selectively facilitating substitution of one of said first and second telephones for the other thereof with respect to message units corresponding to a given telephone call.

22. An apparatus according to claim 21, wherein said second means includes means for operatively coupling said network to a public switching telephone network containing a third telephone, and wherein said given telephone call is an incoming telephone call from said third telephone.

23. An apparatus according to claim 21, wherein said second means includes means for operatively coupling said network to a public switching telephone network containing a third telephone, and wherein said given telephone call is an outgoing telephone call to said third telephone.

24. An apparatus according to claim 21, wherein said first means includes means which is operable, prior to generation of the redirection request, for transmitting message units that represent a predetermined audio message through said network to a further telephone which is coupled to said network and involved in said given telephone call.

25. An apparatus according to claim 21, including a plurality of said first telephones and a plurality of said second telephones, and wherein said first means implements a call center capability.

26. An apparatus according to claim 25, wherein said first means includes means which is operable, prior to generation of the redirection request, for identifying one of said first telephones which is currently free of a call in progress, for thereafter cooperating with said second section to cause said identified first telephone to generate an incoming call indication which is perceptible by a person, and for thereafter responding to a manual operation at said identified first telephone by generating the redirection request.

27. An apparatus according to claim 21, wherein said first means includes means which is operable, after generation of the redirection request, for storing information which corresponds to the redirected call and which can be used to generate a report.

28. An apparatus according to claim 21, wherein said first means includes means which is operable, after generation of the redirection request, for recording the redirected call by storing digital information from the series of message units which correspond to the redirected call.

29. An apparatus according to claim 21, wherein said first means includes a computer which runs a standard operating system.

30. An apparatus according to claim 21, including first and second computers which are coupled to said network, which each have a function other than telephone communications, and which communicate with each other through said network using message units; and wherein said message units conform to an Internet protocol (IP) communication standard.

31. A method of operating a unit having a network interface which can be operatively coupled to a network, said method comprising the steps of:
- effecting an automated virtual simulation of a virtual telephone;
- facilitating transmission of telephone call information to and from said virtual telephone through said network interface using network information message units that contain information in a digital format; and
- automatically and selectively transmitting through said network interface a redirection request to facilitate, with respect to message units corresponding to a given telephone call, a substitution of one for the other of said virtual telephone and a further telephone coupled to the network.

32. A method according to claim 31, wherein said given telephone call is an incoming call originating from a location external to said unit, and including the step of causing said virtual telephone to receive said given call through said network interface.

33. An apparatus according to claim 31, including the step of causing said virtual telephone to originate said given telephone call in a manner so that said given telephone call is directed through said network interface to a location external to said unit.

34. A computer-readable medium encoded with a computer program which, when executed by a computer coupled to a network interface that can be coupled to a network, is operable to cause the computer to:

provide an automated virtual simulation of a virtual telephone;

facilitate transmission of telephone call information to and from the virtual telephone through the network interface using network information message units that contain information in a digital format; and automatically and selectively transmit through the network interface a redirection request to facilitate, with respect to message units corresponding to a given telephone call, a substitution of one for the other of the virtual telephone and a further telephone coupled to the network.

35. A computer-readable medium according to claim 34, wherein said computer program is further operable when executed to handle the given telephone call by one of (1) receiving the given call in the form of an incoming call to the virtual telephone through the network interface from a remote location and (2) originating the given telephone call in the form of an outgoing call from the virtual telephone through the network interface to a remote location.

\* \* \* \* \*

UNITED STATES PATENT AND TRADEMARK OFFICE
CERTIFICATE OF CORRECTION

PATENT NO. : 6,574,331 B1
DATED : June 3, 2003
INVENTOR(S) : William C. Forsythe et al.

It is certified that error appears in the above-identified patent and that said Letters Patent is hereby corrected as shown below:

<u>Column 13,</u>
Line 49, "message" delete "unito" and insert -- units --.
Line 50, after "digital" delete "formal" and insert -- format --.

Signed and Sealed this

Sixteenth Day of March, 2004

JON W. DUDAS
*Acting Director of the United States Patent and Trademark Office*